2,785,950

PROCESSING COMPLEX SILICATES

Alfred M. Thomsen, San Francisco, Calif.

No Drawing. Application August 17, 1955,
Serial No. 529,075

4 Claims. (Cl. 23—1)

This application is a continuation, in part, of a former application bearing Serial No. 262,181, filed December 17, 1951, now abandoned. The instant application is concerned primarily with the method used in processing a silicate consisting principally of magnesium silicate. Such material occurs in nature as the generic rock, serpentine, which in turn is an alteration product of the primary rocks saxonite and dunite. All such material is of a highly basic nature and may be classed as "olivine complexes," i. e., rocks in which a true magnesium silicate has been varied by a partial replacement of magnesium with iron, manganese, chromium, calcium, aluminum, etc. The generic appelation, "complex silicates," is thus well chosen. In addition, such complexes often contain in mechanical admixture well known minerals consisting largely of manganese, iron and chromium, while nickel is virtually always a component to some extent, though often small. The aim and object of my process is to separate these bases from one another and from silica and to do so in such a manner that all of said ingredients, with definite emphasis on the silica, is finally obtained in such a form that it has commercial value.

To clearly set forth my process I will use as a preferred illustration its use on a specific alteration product of serpentine itself. Where climatic conditions and geographical location favor such an alteration the so-called "laterite" is formed. This occurs as a "capping" over a serpentine body and is generally much enriched in iron and nickel as well as in aluminum and manganese and chrome. Obviously, it is also less rich in magnesium and in silica. Nevertheless these latter components still form most of the deposit so the illustration is apt for any other olivine complex that has not been subjected to such enrichment.

It is assumed that the chemical composition of such a laterite is as follows: nickel, 2%; iron 5%, manganese 1%, aluminum 3%; the balance being mainly magnesium and silica. About 1% of chromite is also present but as it is not chemically combined it will be treated as a separate item. This "ore" is now finely ground, say to 100 mesh and mixed with sulphuric acid of 92% strength. The correct amount is determined by actual analysis of the ore but, provisionally, the demand will be about 1½ times the weight of the ore. Under certain conditions an exothermic reaction will set in and the mass of mixed ore and acid will set up to a cement-like mass. If this does not occur then said reaction is induced by the application of heat. To avoid manual labor in handling, the mixed acid and ore may be run into a kiln heated to a low temperature with direct fire. The temperature of the mass should not exceed 400° C. to avoid decomposition and loss of acid and it will be discharged from the kiln as a "pebbled" substance resembling cement clinker. This product is easily disintegrated in water forming a slurry of silicious residual, the chromite, and any other unacted upon material as the solid part. The solution will consist of a mixture of the bases which the acid has converted to soluble sulphates.

Separation is next made in any conventional manner, such as filtering between soluble and insoluble components. The filter cake, after washing and drying, will be found to have excellent adsorbent properties, somewhat intermediate in properties between a silica gel and an acid-treated clay. Other uses would be to convert it to sodium silicate or to mix it with lime, mold and steam harden it as an excellent insulating and building material. This separated silica has highly reactive properties making it exceedingly suitable for the purposes enumerated, such uses, however, are beyond the scope of this disclosure save to make mention of the fact.

If the chromite present in the filter cake is either objectionable or in sufficient quantity to make saving it desirable then its high gravity and complete separation from the silica makes its separation by any conventional form of ore dressing an easily accomplished operation.

The filtrate from said cake consists as already stated of a solution of the water soluble sulphates produced in acid treatment. The iron resident therein is first oxidized by any conventional means and then precipitated with ammonium carbonate, a special form of which will be described hereafter. When said iron is thus treated the aluminum will be found to be co-precipitated so the filter cake yielded on filtration will consist of the mixed hydroxides of iron and aluminum. As a subsequent step separation between these items can be made by the conventional bauxite refining step, virtually universally used in the preparation of alumina. If such separated alumina be precipitated upon the silicious residue resulting from the primary acid treatment an exceedingly efficient catalyst will be the result. Parenthetically, it may be stated that the lower the kiln temperature the better will be the mechanical properties of said silica. For best results 200° C. should not be exceeded.

The iron-free solution resulting from said precipitation and filtration is next commingled with ammonium sulphide and a dark colored precipitate of manganese and nickel is likewise separated. The amount of ammonium sulphide required is determined by test on a filtered sample. When a further addition of sulphide no longer produces a dark colored precipitate the amount added is adequate. After removal of said precipitate the filtrate will consist essentially of a solution of the sulphates of ammonium and magnesium.

This precipitate is in turn worked for manganese and nickel by any one of the many methods known to anyone familiar with hydro-metallurgy and is entirely conventional. The filtrate is commingled with a sufficient amount of ammonium carbonate to precipitate the magnesium resident therein and separation is again made between the precipitated magnesium carbonate and the residual solution of ammonium sulphate. Inasmuch as a double salt can form between an excess of ammonium carbonate and magnesium carbonate it is essential to avoid an excess of ammonium carbonate or else to boil to expel said excess before filtration.

This peculiarity of double salt formation can, however, be used as a means of producing an exceedingly pure magnesium carbonate. If an excess of about 100% of ammonium carbonate be used at room temperature and said mixture be left over night then a crystalline double carbonate will result and almost any impurity present in the original solution will be found in the mother liquor from said crystallization, the crystals being very pure. After separation of said crystals, preferably by a centrifuge, and heating until ammonium carbonate is expelled a very pure magnesium carbonate will result. The final end product, in either event, will obviously be a solution of ammonium sulphate.

In the event that a satisfactory market can be found for said ammonium sulphate then the disposal of same by conventional evaporation and crystallization requires no further explanation. If the herein described process be taken as an integral part of applicant's many versions of sulphur utilization from sulphide ores and his developments of ammonia synthesis, now existing in the form of a series of granted patents, patents allowed but not yet issued, and later applications based upon the same themes, this use of the ammonium sulphate will be found in most instances economically sound.

In the event that such technique be undesirable, then I avail myself of a well known property of ammonium sulphate and re-cycle any part of said ammonium sulphate back to the head of the process as a substitute for an equivalent part of sulphuric acid. Obviously, the ammonia thus liberated in the sulphating operation is recoverable by scrubbing with water thus obtaining a solution of ammonium carbonate as well as salvaging any sulphuric compounds due to volatilization, the fuel used in the kiln furnishing the needed carbon dioxide. At this point it is convenient to mention the fact that an excess of carbon dioxide over and above that required to form the normal carbonate is superior to said normal carbonate and I avail myself of this property in making an ammoniacal product producing a more filterable precipitate than would be otherwise obtained. In the claims I, therefore, use the expression "carbonated ammonia" to describe something intermediate between a carbonate and a bi-carbonate produced at the will of the operator in accordance with the running of the filters where such use is made of carbonated ammonia. In the event that only a part of said ammonium sulphate be re-cycled it is obvious that additive $NH_3$ to the scrubbers will cover any deficiency and that all ammonia needed will be thus supplied if only sulphuric acid be used in the sulphating step.

Having thus described in full my preferred illustration I will now call attention to sundry minor modifications all of which I consider as within the scope of this disclosure. Thus, from mechanical considerations solely I may elect to sulphate the ore on a two stage operation instead of in a single step as herein related. I would thus mix the ore with say two-thirds of the total acid requirement, heat, leach and filter. I would then re-treat the filter cake from said operation with the remaining one-third of the acid and repeat the operation once again. By this technique some undesirable mechanical difficulties, such as "ringing-up" in the kiln is eliminated. In addition the character of the silica is improved thereby, it being obvious from the description previously given that the object of the controlled heating, between 200 and 400 degrees C., is to obtain a partially dehydrated silica so as to avoid the filtering difficulties inherent in gelatinous silica and yet retain the adsorbent properties so desired from economic considerations.

Similarly, the sulphide step could be eliminated and a precipitation with carbonated ammonia could be introduced between the iron removal and the magnesium precipitating stage. The reaction would be incomplete but if all of the ammonium sulphate were re-cycled it would be of no moment. Also, the magnesia would not be as pure, but as the large market for such material is relatively low grade, 96% MgO being considered excellent, it would not prove inadmissible. Likewise the chrome comes in for some consideration as in certain types the amount may be large. I have regarded the chrome as inert. This is only true if relatively coarse powdering such as 100 mesh is considered. If ground to −325 mesh the chrome will likewise go into solution in the sulphating step. Obviously the ore could be ground so fine or the separated chromite could be re-ground and re-treated after the separation previously described.

It is likewise obvious that a partial solution of the ore would result if an insufficient amount of acid, and/or recycled ammonium sulphate were employed. On a laterite, such a diminished use of acid would result in a preferential attack upon the nickel constituent. Such modifications may, at times, be of considerable value and I regard all such as being within the scope of this disclosure.

Having thus fully described my process, I claim:

1. The method of processing a complex magnesium containing silicate which comprises; commingling the powdered complex with sulphuric acid and heating the mixture to a temperature intermediate between 200 and 400 degrees centigrade; disintegrating the resultant product in water and separating the insoluble partially dehydrated silica thus obtained; oxidizing the resultant solution of metallic sulphates and precipitating the resident iron and aluminum by the addition thereto of carbonated ammonia; removing the precipitated iron-aluminum hydroxides thus obtained; adding ammonium sulphide to the resultant solution as long as a dark colored precipitate is obtained; removing said precipitate; commingling the resultant solution after the removal of said precipitate with carbonated ammonia and removing the magnesium carbonate thus produced leaving a resultant solution of ammonium sulphate.

2. The method of processing a complex magnesium containing silicate set forth in claim 1, with the added step that the ammonium sulphate produced as a final product therein be re-cycled to the sulphating step thus replacing an equivalent amount of sulphuric acid.

3. The method of processing a complex magnesium containing silicate set forth in claim 1, with the added step that the carbonated ammonia used to precipitate the resident magnesium as carbonate be added in sufficient excess to cause said magnesium to separate as the crystallized double carbonate of magnesium and ammonium.

4. The method of processing a complex magnesium containing silicate set forth in claim 1, with the added step that sulphating be effected in two separate steps with an intermediate leaching step, a deficient amount of acid being employed in the first sulphating step followed by leaching and the remainder of the acid then being commingled with the insoluble residue obtained in the leaching step.

References Cited in the file of this patent
UNITED STATES PATENTS

| | | |
|---|---|---|
| 1,831,673 | Liebknecht | Nov. 10, 1931 |
| 1,957,579 | Crew | May 8, 1934 |
| 2,010,655 | Wollner et al. | Aug. 6, 1935 |
| 2,248,472 | Zintl et al. | July 8, 1941 |
| 2,402,370 | Chalmers | June 18, 1946 |
| 2,462,236 | Thomas | Feb. 22, 1949 |